United States Patent [19]

Sumpter et al.

[11] Patent Number: 5,432,140
[45] Date of Patent: Jul. 11, 1995

[54] HEAT CURABLE ORGANOPOLYSILOXANE COMPOSITIONS, PREFORMED LATENT PLATINUM CATALYSTS, AND METHODS FOR MAKING

[75] Inventors: Chris A. Sumpter; Larry N. Lewis, both of Scotia; William B. Lawrence, Cairo, all of N.Y.

[73] Assignee: General Electric Company, Schenectady, N.Y.

[21] Appl. No.: 154,420

[22] Filed: Nov. 19, 1993

Related U.S. Application Data

[60] Division of Ser. No. 955,987, Oct. 13, 1992, Pat. No. 5,331,075, which is a continuation-in-part of Ser. No. 800,311, Nov. 29, 1991, abandoned.

[51] Int. Cl.⁶ .............................................. C08G 77/08
[52] U.S. Cl. ...................................... 502/167; 528/15; 528/31; 528/32; 525/478
[58] Field of Search ................. 528/15, 21, 31, 32; 525/478; 502/167

[56] References Cited

U.S. PATENT DOCUMENTS

| | | |
|---|---|---|
| 3,188,299 | 6/1965 | Calk . |
| 3,344,111 | 9/1967 | Chalk . |
| 3,775,452 | 11/1973 | Karstedt . |
| 4,256,616 | 3/1981 | Hatanaka et al. . |
| 4,281,093 | 7/1981 | Garden . |
| 4,374,967 | 2/1983 | Brown et al. . |
| 4,511,715 | 4/1985 | Palensky et al. . |
| 4,584,361 | 4/1986 | Janik et al. . |
| 4,681,963 | 7/1987 | Lewis . |
| 4,791,186 | 12/1988 | Janik et al. . |
| 4,801,642 | 1/1989 | Janik et al. . |
| 4,916,169 | 4/1990 | Boardman et al. . |
| 5,036,117 | 7/1991 | Chung et al. . |
| 5,066,699 | 11/1991 | Lee et al. . |
| 5,122,585 | 6/1992 | Sumpter et al. . |
| 5,125,998 | 6/1992 | Jones et al. . |
| 5,331,075 | 7/1994 | Sumpter et al. ............ 528/15 |

OTHER PUBLICATIONS

Article—Synthesis and Structure of a rac-Tris(divinyl-disiloxane)diplatinum(0) Comples and its Reaction with Maleic Anhydride, p.B. Hitchcock et al.—Angew. Chem. Int. Ed. Engl. 30(1991) No. 4—pp. 438–440.
Article—The Steric Effect in Bis(2,2′-Bipyridyl) and Bis(1,10-Phenanthroline) Metal Compounds, Ed McKenzie—Coord. Chem. Rev., 6 (1971) pp. 187–216.
Article—Preparation and Electronic Spectra of Some alkyl–and Aryl(2,2′-Bipyridine)Platinum(II) Complexes, N. Chaudhury et al. Journal of Organometallic Chem. 84(1975) pp. 105–115.

*Primary Examiner*—Asok Pal
*Attorney, Agent, or Firm*—William H. Pittman

[57] ABSTRACT

Heat curable organopolysiloxane compositions are provided utilizing a vinyl silicone organopolysiloxane fluid, a silicon hydride siloxane and an effective amount of a preformed latent platinum catalyst resulting from the reaction in the substantial absence of organopolysiloxane fluid, between a zero valent platinum catalyst and an organic nitrogen compound, such as 2,2′-bipyridine or diethyl azodicarboxylate.

26 Claims, No Drawings

HEAT CURABLE ORGANOPOLYSILOXANE COMPOSITIONS, PREFORMED LATENT PLATINUM CATALYSTS, AND METHODS FOR MAKING

CROSS REFERENCE TO RELATED APPLICATION

This application is a division of application Ser. No. 07/955,987, filed Oct. 13, 1992 now U.S. Pat. No. 5,331,075, which is a continuation-in part of of application, Ser. No. 07/800,311, filed Nov. 29, 2991 now abandoned. Reference also is made to application Ser. No. 07/800,310, filed Nov. 29, 1991.

BACKGROUND OF THE INVENTION

The present invention relates to heat curable organopolysiloxane compositions which utilize a silicon hydride siloxane fluid, silicon vinyl siloxane fluid and a preformed latent platinum catalyst. More particularly, the present invention relates to preformed latent platinum catalysts resulting from reaction between a zero valent platinum complex and an organic nitrogen compound, such as 2,2'-bipyridine, (BIPY) or diethylazodicarboxylate (DEAD) where the reaction to form the preformed latent platinum catalyst is effected in the substantial absence of a silicone fluid.

Prior to the present invention, as shown by Chalk, U.S. Pat. No. 3,188,299, stable mixtures of organosilicon compositions such as mixtures of an alkenyl polysiloxane and a hydrogen polysiloxane and a platinum (II) catalyst were provided having a nitrogen containing ligand. The Chalk patent discloses that chloroplatinic acid can be modified with a nitrogen containing compound such as BIPY. The use of an aromatic heterocyclic nitrogen compound added separately as an inhibitor to a mixture of platinum catalyst, silicone hydride fluid and silicone vinyl fluid is shown by Brown et al, U.S. Pat. No. 4,374,967. A low temperature silicone gel having a greater work life is obtained.

Additional storage stable one part curable organopolysiloxane compositions are shown by Eckberg, U.S. Pat. No. 4,670,531 which suggests the use of DEAD as a separately added inhibitor, or Janik et al, U.S. Pat. Nos. 4,584,361, 4,791,186, and 4,801,642, where certain aliphatic and cycloaliphatic triamines and alkenyl diamines are described which are utilized separately as inhibitors in combination with platinum catalyst in silicone fluid mixtures, to impart long term storage stability at temperatures of up to 40° C., while allowing such silicone compositions to cure at an enhanced rate at 135° C.

Although improved shelf stability over an extended period of time, and cure times at elevated temperatures have been obtained by using various separately added nitrogen containing inhibitors with platinum catalysts in the preparation of one part heat curable organopolysiloxane compositions, the silicone industry is constantly evaluating platinum catalyzed heat curable, one package silicone compositions to optimize their room temperature shelf stability and their cure time at elevated temperatures. As used hereinafter the term "shelf stability" means accelerated shelf aging conditions at 50° C., while "cure time" means rate of cure at from 120° C. to 150° C.

SUMMARY OF THE INVENTION

The present invention is based on the discovery that one package, heat curable organopolysiloxane or silicone compositions can be obtained having superior shelf stability as measured under accelerated aging conditions at 50° C., and cure time at 150° C. by the employment of certain preformed latent platinum catalysts. The preformed latent platinum catalyst can be made by heating at a temperature of about 0° C. to 100° C. a mixture consisting essentially of (a) a zero valent platinum complex, (b) from about 1.0 to about 60 moles and preferably about 5 to about 30 moles of an organic nitrogen compound per mole of the zero valent platinum complex, and (c) from 0 to about 99 parts by weight of an inert organic solvent based on 100 parts by weight of the sum of (a), (b) and (c), where the organic nitrogen compound of (b) is a member selected from the class consisting of aliphatic nitrogen compounds, heterocyclic aromatic nitrogen compounds, and mixtures thereof having the characteristic polyvalent structural unit,

$$(-)_n Q - N = Q^1 (-)_m \qquad (1)$$

Q is a carbon or nitrogen radical, $Q^1$ is a carbon or nitrogen radical, n is an integer equal to 2 or 3, and m is an integer equal to 1 or 2.

The preformed latent platinum catalyst utilized in the present invention can be distinguished from platinum complexes shown by N. Chaudhury, et al, Journal of Organometallic Chemistry 84 (1975) 105-115 which describes the preparation and the electronic spectra of some alkyl and aryl(2,2'-bipyridine) platinum (II) complexes. The term zero valent platinum complex which is used in the preparation of the preformed latent platinum catalyst of the present invention, is more particularly shown by Peter B. Hitchcock et al for, "A Convenient and Novel Route to Bis($\eta$-alkyne)platinum (0) and Other Platinum (0) Complexes from Speier's Hydrosilylation Catalyst $H_2[PtCl_6] \cdot xH_2O$, Organometallics (1987), 6, 191-192 and Angew. Chem. Int. Ed. Engl. 30 (1991) No. 4, pages 438-440. An example of a zero valent platinum complex is shown by Karstedt, U.S. Pat. No. 3,775,452.

STATEMENT OF THE INVENTION

There is provided by the present invention, a heat curable organopolysiloxane composition capable of resisting a substantial increase in viscosity after at least a five day accelerated aging period at 50° C., comprising, (A) vinyl organopolysiloxane fluid
(B) silicon hydride siloxane, and
(C) an amount of a preformed latent platinum catalyst which is effective for catalyzing addition between (A) and (B), where the preformed latent platinum catalyst is made by effecting reaction in the absence of (A) or (B) or mixture thereof, between a zero valent platinum complex and 1.0 to 60 moles of an organic nitrogen compound per mole of platinum and the organic nitrogen compound is a member selected from the class consisting of aliphatic nitrogen compounds, heterocyclic aromatic nitrogen compounds and mixtures thereof having the characteristic polyvalent structure unit of formula (1).

There is further provided by the present invention, a heat curable organopolysiloxane composition capable of resisting a substantial increase in viscosity after at least a five day accelerated aging period at 50° C., comprising by weight, (D) 100 parts of a vinyl organopolysiloxane fluid,
(E) 1 to 20 parts of a silicon hydride siloxane fluid, and
(F) an amount of a preformed latent platinum catalyst which is effective for catalyzing addition between (A) and (B), where the preformed latent platinum catalyst is made by effecting reaction in the absence of (A) or (B) or mixture thereof, between a zero valent platinum complex and 1.0 to 60 moles of an organic nitrogen compound as previously defined having the characteristic structural unit of formula (1) per mole of platinum.

Organic nitrogen compound having the characteristic structural unit of formula (1) can have a molecular weight in the range of about 100 to 2000 and preferably 114 to about 1000 and can be selected from azodicarboxylates, triazoline diones, quinoxalines, quinazolines, azodiketones and heterocyclic aromatic nitrogen compounds.

Some of the azodicarboxylates which can be used are for example, diethylazodicarboxylate, diisopropylazodicarboxylate, dibutylazodicarboxylate, di-t-butylazodicarboxylate and dibenzylazodicarboxylate.

Among the triazoline diones there are included, 4-phenyl-1,2,4-triazoline-3,5-dione and 4-methyl-1,2,4-triazoline-3,5-dione.

Included among the azodiketones are azobistoluoyl, azobisbenzoyl, azobis(N,N-dimethylformamide), azodicarbonyldipiperidine, azobisacetyl and azobisbenzoyl.

The heterocyclic aromatic nitrogen compounds which can be used are for example, 2,2-bipyridine, 1,10-phenanthroline, neocuproine, biquinoline, terpyridine, bipyrazine, phthalazine, quinazoline, quinoxaline, quinoline, isoquinoline, 4,4'-dipyridyl, 3,3'-dipyridyl, 2,4'-dipyridyl, benzimidazole, indazole, dipyridyl ketone, pyridine, 2,2':6',2''-terpyridine and 4,4'-trimethylenedipyridine.

Inert organic solvents which can be used in the preparation of the preformed latent platinum catalyst are any organic solvents inert to components during catalyst formation. There are included for example, toluene, hexane, benzene, methylene chloride and tetrahydrofuran. Solvents which are excluded are dipolar aprotic solvents, water and alcohols.

The vinyl organopolysiloxane fluid, or "vinylsiloxane" utilized in the one part heat curable organopolysiloxane compositions of the present invention can have a viscosity of from about 100 to 200,000 centipoises and a vinylsiloxy unit content of about 0.05 to about 3.5 mole %, and preferably 0.14 to about 2 mole % based on the total siloxy units having one or more organo radicals as defined hereinafter attached to silicon. The preferred vinyl siloxanes are included within the following formula,

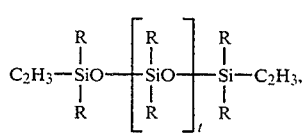

(2)

where $C_2H_3$ is vinyl, and R is selected from $C_{(1-13)}$ monovalent hydrocarbon radicals free of olefinic unsaturation, and t is a positive integer having a value sufficient to provide a vinyl siloxane viscosity of from about 100 to 200,000 centipoises at 25° C. Preferably, R is selected from alkyl radicals of 1 to 8 carbon atoms, such as methyl, ethyl, propyl; mononuclear aryl radicals such as phenyl, methylphenyl, ethylphenyl; cycloalkyl radicals, cycloheptyl and haloalkyl radicals such as 3,3,3-trifluoropropyl. Preferably, the vinyl siloxane has terminal units of the formula,

The vinylsiloxanes of Formula (2) are generally prepared by equilibrating the appropriate cyclotetrasiloxane with appropriate vinyl terminated low molecular weight polysiloxane chain-stoppers. However, if vinyl organosiloxy units are desired in the backbone, a predetermined amount of cyclic vinyl organosiloxane can be used in the equilibration mixture. A preferred chain-stopper for the equilibration reaction is a low molecular weight vinyl terminated organopolysiloxane such as the corresponding disiloxane, trisiloxane, tetrasiloxane. These low molecular weight vinyl terminated polysiloxane polymers are produced by hydrolyzing the appropriate chlorosilanes particularly vinyl diorganochlorosilanes along with diorganodichlorosilanes to produce the desired chain-stopper. The chain-stopper can be equilibrated with octamethylcyclotetrasiloxane in the presence of a catalyst to produce the desired vinyl siloxane having a viscosity varying from 100 to 200,000 centipoises at 25° C. The catalyst that is utilized is preferably a mild acid catalyst, such as toluenesulfonic acid or an acid treated clay such as Filtrol, which is a sulfuric acid activated clay manufactured and sold by Engelhard Corp. of Edison, N.J. When the equilibration has proceeded to about 85% completion, the acid catalyst can be neutralized with a base or simply filtered if acid activated clay is used to leave behind the linear polymer. Preferably, excess cyclics are stripped off so that the linear polymer will have a low volatile content and be relatively pure. There can also be utilized an alkali metal hydroxide as the catalyst such as for instance potassium or sodium hydroxide.

The silicon hydride siloxane or silicon hydride siloxane fluid used in the invention can have about 0.04 to about 14% by weight of chemically combined hydrogen attached to silicon. One form of the silicon hydride siloxane is a "coupler" having the formula,

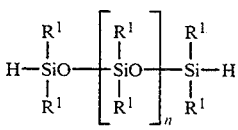

(3)

where $R^1$ is selected from $C_{(1-13)}$ monovalent hydrocarbon radicals free of olefinic unsaturation and n is an integer having a value sufficient to provide the "coupler" with a viscosity of 1 to 500 centipoises at 25° C. and from about 3 to. 9 mole percent of chain-stopping diorganohydride siloxy units, based on the total moles of chemically combined siloxy units in the silicon hydride siloxane fluid.

In addition to the silicone hydride coupler of formula (3), the silicon hydride siloxane fluid used in the heat curable organopolysiloxane compositions of the present invention also can include silicon hydride resins consisting essentially of the following chemically combined units,

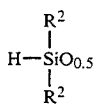

chemically combined with $SiO_2$ units, where the $R^2+H$ to Si ratio can vary from 1.0 to 2.7. Silicon hydride resin also can have units of the formula,

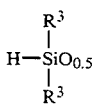

chemically combined with $SiO_2$ units and $(R^4)_2SiO$ units, where the $R^3+R^4+H$ to Si ratio can vary from 1.2 to 2.7, where $R^2$, $R^3$ and $R^4$ are $C_{(1-13)}$ monovalent hydrocarbon radicals free of olefinic unsaturation selected from $R^1$ radicals.

The silicon hydride siloxane fluid can be made by hydrolyzing the corresponding hydride chlorosilanes in the presence of an organic hydrocarbon solvent. For resins having only monofunctional units and tetrafunctional units, a hydrogen diorganochlorosilane can be hydrolyzed with a tetrachlorosilane. Resins having monofunctional siloxy units, difunctional siloxy units, and tetrafunctional siloxy units, can be obtained by hydrolyzing a hydrogen diorgano dichlorosilane, a tetrachlorosilane and a diorganodichlorosilane at particular ratios. Additional silicon hydride resin are shown by Jeram, U.S. Pat. No. 4,040,101 which is hereby incorporated by reference.

The silicon hydride siloxane fluid also can include linear hydrogen containing polysiloxane having the formula,

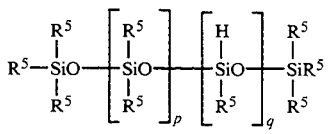

(4)

where $R^5$ is a $C_{(1-13)}$ monovalent hydrocarbon radical free of olefinic unsaturation, selected from $R^1$ radicals, and p and q are integers having values sufficient to provide a polymer having a viscosity of from 1 to 1,000 centipoises at 25° C.

The silicon hydride siloxane fluid of formula (4) can be produced by equilibrating the appropriate hydrogencyclopolysiloxane with the appropriate cyclopolysiloxane containing $R^5$ substituent groups, in combination with low molecular weight linear triorganosiloxy end-stopped chain-stoppers.

In formulas (3) and (4) and the chemically combined units described above, $R^1$, $R^2$, $R^3$, $R^4$ and $R^5$ can be the same or different radicals selected from the group consisting of alkyl radicals of 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The silicon hydride coupler of formula (3) can be prepared by a hydrolysis process or an acid catalyzed equilibration process. In the equilibration process, the appropriate cyclotetrasiloxanes are equilibrated with a low molecular weight hydrogen terminated chain-stopper, such as a dihydrogen tetraorganodisiloxane. The acid catalyzed equilibration reaction is much the same as disclosed for the production of the vinyl containing base polymer. By the hydrolysis process, the appropriate hydrogen diorganochlorosilanes are hydrolyzed with the appropriate amount of diorganodichlorosilanes to produce the desired polymer of formula (3) above. When the silicon hydride coupler is produced, it can be separated from the undesirable amount of cyclics by stripping.

There may be incorporated in the heat curable organopolysiloxane compositions of the present invention from 5 to 100 parts by weight of a filler based on 100 parts by weight of vinyl siloxane. A filler can be selected from fumed silica, precipitated silica and mixtures thereof. Preferably less than 50 parts by weight of filler, per 100 parts by weight of the vinyl siloxane is utilized. In place of the reinforcing filler, such as fumed silica, and precipitated silicas, there may be utilized extending fillers which do not unduly increase the viscosity of the composition in the uncured state, by increasing to some extent the tensile strength of the composition. The reinforcing and extending fillers are for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cork, cotton, synthetic fibers and so forth.

For liquid injection molding applications, it has been found desirable to limit the viscosity below 500,000 centipoises at 25° C. and more preferably, below 200,000 centipoises at 25° C.

Cure of the heat curable compositions of the present invention, can be achieved at temperatures of from 100° C. to 200° C. and preferably 120° C. to 150° C.

An effective amount of preformed latent platinum catalyst which is used in the one-part heat curable organopolysiloxane composition is an amount sufficient to provide 5 ppm to 200 ppm of Pt, based on the weight of heat curable organopolysiloxane mixture, and preferably 10 ppm to 100 ppm.

In order that those skilled in the art will be better able to practice the present invention, the following examples are given by way of illustration and not by way of limitation. All parts are by weight.

EXAMPLE 1

A preformed latent platinum catalyst was prepared as follows:

There was added 21.1 μL, (25 ppm Pt, $6.41 \times 10^{-6}$ mols Pt) of a zero valent platinum complex in a xylene solvent as shown by Karstedt, U.S. Pat. No. 3,775,452, resulting from the reaction of chloroplatinic acid, symmetrical-tetramethyldivinyldisiloxane and sodium bicarbonate to a solution of 15 mg ($9.63 \times 10^{-5}$ mols) of 2,2′-bipyridine and methylene chloride in the form of a water white solution. Upon addition of the platinum complex, a color change from water white to bright yellow occurred within 10 seconds. The resulting reaction mixture was then stirred for 4 hours at room temperature and no additional color change was observed. Based on method of preparation, the resulting mixture was an organic solvent solution of a preformed latent platinum catalyst resulting from reaction under ambient conditions between zero valent platinum complex and 2,2′-bipyridine having 15 moles of 2,2′-bipyridine per mole of platinum. A sample of a 1% by weight solution of the preformed latent platinum catalyst was analyzed by EXAFS (Extended X-ray Absorption Fine Structure), and was found to be free of platinum-nitrogen bonds and contained platinum-carbon bonds.

An additional procedure for making the preformed latent platinum catalyst involved the initial preparation of the zero valent platinum complex shown by Example 4 of Karstedt, U.S. Pat. No. 3,775,452, which is incorporated herein by reference. There was obtained a yellow to dark brown oil having the structure which is now known to contain three tetramethyldivinyldisiloxane units for every two platinum atoms, see G. Chandra, P.Y.Lo., P. B. Hitchcock, M. F. Lappert, Organometallics (1987) 6 (9) and P. B. Hitchcock, M. F. Lappert, N. J. Warhurst, Angew. Chem. Int. Ed. Engl. 30 (1991) 438. There was added (0.026 g, $1.68 \times 10^{-4}$ mols) of 2,2'-bipyridine in 1 mL of $C_6D_6$ to 0.132 g ($1.40 \times 10^{-4}$ mols Pt) of the above platinum siloxane complex. The resulting mixture having 1.2 equivalents of 2,2'-bipyridine per mol of Pt was stirred at room temperature for 10 to 90 minutes. Based on method of preparation, there was obtained a preformed latent platinum catalyst. Its identity was further confirmed by $^1H$ and $^{13}C$ NMR analysis which confirmed the presence of new aromatic peaks at δ: 8.63 (dd, 2H, J=1,9 Hz), 8.47 (dd, 2H, J=1 1.5 Hz), 7.19 (ddd, 2H, J=1, 5, 16 Hz), 6.67 (ddd, 2H, J=1, 9, 16 Hz)ppm; cf. BIPY $^1H$ NMR δ: 8.72 (dd, Hz, 2H, J=1, 8 Hz), 8.51 (dd, 2H, J=2, 5 Hz), 7.19 (ddd, 2H, J=1, 5, 16 Hz), 6.67 (ddd, 2H, J=1, 8, 16 Hz)ppm; $^{13}C$ NMR δ: 156.2, 148.9, 136.2, 123.2, 120.7 ppm; cf. BIPY $^{13}C$ NMR δ: 156.6, 149.3, 136.6, 123.7, 121.1 ppm; IR (KBr) showed new peaks at 1597 (w), 1584 (w), 1456 (m), 1412 (m), 758 (w) cm$^{-1}$; cf. BIPY IR (KBr), 1989 (w), 1966 (w), 1871 (w), 1712 (w), 1580 (s), 1559 (s), 1452 (s), 1416 (s), 756 (s) cm$^{-1}$. $^1H$ and $^{13}C$ NMR showed that only free methyl and vinyl radicals ($M^{vi}M^{vi}$) were present; no Pt coordinated to $M^{vi}M^{vi}$ was present after the addition of BIPY. Thus, presumably the $M^{vi}M^{vi}$ ligand was replaced by BIPY to form a new $Pt^o(BIPY)_x$ complex.

EXAMPLE 2

A heat curable organopolysiloxane composition was prepared by adding a sufficient amount of the preformed latent platinum catalyst of example 1 to a vinyl silicone organopolysiloxane fluid having terminal dimethylvinylsiloxy units and an average of 350 dimethylsiloxy units to provide 25 ppm of Pt per 100 parts of vinyl silicone fluid. The resulting mixture was then thoroughly mixed. There was then added 4 parts of a silicon hydride siloxane fluid having chemically combined hydride siloxy units and a viscosity of 150 centipoise at 25° C. The resulting mixture was then thoroughly mixed. Upon addition of the silicon hydride siloxane fluid, the resulting composition turned pink in 30 seconds and then changed to a gold color in three minutes. Based on method of preparation, the resulting mixture was a heat curable organopolysiloxane composition having 25 ppm of platinum and a viscosity of 3240 centipoise at 25° C.

The above procedure was repeated except that in place of using the preformed latent platinum catalyst of example 1, a heat curable organopolysiloxane composition was prepared by adding 15 mg of 2,2'-bipyridine (0.03 wt %) to 100 parts of the above vinyl terminated polydimethylsiloxane followed by the addition of 29.1 μL of the zero valent platinum complex of Karstedt, U.S. Pat. No. 3,775,452. There was then added 4 parts of the silicone hydride siloxane fluid as shown above. Based on method of preparation there was obtained an organopolysiloxane composition containing 25 ppm of platinum and 2,2'-bipyridine as an inhibitor.

A comparison was made between the heat curable organopolysiloxane compositions containing the preformed latent platinum catalyst of example 1 and the mixture of the zero valent platinum complex and 2,2'-bipyridine inhibitor in the above organopolysiloxane ingredients. A determination was then made of the heat aging characteristics of these respective silicone mixtures at 50° C. over a 5 day period with respect to a change in viscosity from the initial viscosity at ambient temperatures. The results are shown in Table 1 below where 2,2'-bipyridine which was added separately to the mixture is shown as "inhibitor".

TABLE 1

| Silicone Mixture (catalyst) | Pt (ppm) | Bipyridine (Wt %) | Initial Viscosity | Heat Aged** Viscosity |
|---|---|---|---|---|
| Preform | 25 | 0.03* | 3240 | 3820 |
| Inhibitor + Zero Valent Complex | 25 | 0.03 | 3220 | 4650 |
|  |  | 0.05 | 3230 | 4200 |
|  |  | 0.10 | 3240 | 3860 |

*wt % used in forming preformed latent catalyst
**5 days at 50°C.

The above results show that although the initial viscosity of the respective heat curable mixtures are the same, after a 5 day heat aging period at 50° C. which is equivalent to about 120-140 days at 25° C., the viscosity of the heat curable mixture containing the preformed latent catalyst exhibits greater stability than the use of the zero valent platinum complex and separately added inhibitor.

A gel time study using a Sunshine gel timer was also made to determine the cure speeds of the respective heat curable organopolysiloxane mixtures containing the preformed latent platinum catalyst of example 1 as compared to the use of a zero valent platinum complex containing the 2,2'-bipyridine added separately. The following results were obtained:

TABLE 2

| | Wt % 2,2'-Bipyridine | 120° C. Gel Time (Sec) | 150° C. Gel Time (Sec) |
|---|---|---|---|
| Preform | 0.03* | 547 | 162 |
| Inhibitor + Zero Valent Complex | 0.03 | 552 | 175 |
|  | 0.05 | 815 | 181 |
|  | 0.10 | 1242 | 225 |
|  | 0.15 | — | 328 |
|  | 0.20 | — | 373 |
|  | 0.30 | — | 459 |

Although the above Table 1 indicates that increasing the concentration of inhibitor tends to improve the heat aging ability of the heat curable organopolysiloxane composition, Table 2 shows that higher levels of the 2,2'-bipyridine inhibitor also can decrease the cure speed of the heat curable organopolysiloxane composition.

An additional cure speed determination was made comparing heat curable organopolysiloxane compositions containing the preformed latent platinum catalyst of example 1 and a mixture of the zero valent platinum complex and the 2,2'-bipyridine inhibitor over a 4 week shelf period at room temperature. The following results were obtained:

TABLE 3

| | Wt %<br>2,2'-Bipyridine | 150° C.<br>Gel Time (Sec)<br>After 4 Weeks (25° C.) |
|---|---|---|
| Preformed<br>latent Catalyst | 0.03* | 165 |
| Inhibitor +<br>Zero Valent | 0.03 | 255 |
| Complex | 0.05 | 242 |
| | 0.10 | 284 |
| | 0.15 | 595 |
| | 0.20 | 875 |
| | 0.30 | 2020 |

The above results demonstrate that the preformed latent platinum catalyst can impart superior cure speed and shelf stability to heat curable organopolysiloxane compositions as compared to the separate use of the zero valent platinum complex and the 2,2'-bipyridine even after a 4 week shelf period at room temperature. It is further demonstrated that the superior cure speed of the preformed latent catalyst organosiloxane compositions remain constant over a four week period at ambient temperature while the zero valent platinum complex and separately added inhibitor compositions have increasing cure speeds over the same four week period.

EXAMPLE 3

Dimethyl (2,2'-bipyridine) platinum (II) was prepared in accordance with the procedure of N.Chaudhury et al, Journal of Organometallic Chemistry, 84 (1975), 105-115. Equal molar amounts of a dimethyl platinum complex of 1, 5-cyclooctadiene (CODPtMe$_2$) (0.33 g) and 2,2'-bipyridine (0.16 g) were stirred in 20 mL of diethyl ether for 12 hours at ambient temperatures. There was then added 20 mL of hexane. After 2 hours an orange solid was collected, washed with hexane and dried in vacuo. Based on method of preparation and $^1$H NMR there was obtained dimethyl(2,2'-dipyridine) platinum (II).

A heat curable formulation was prepared utilizing 60 g of vinyl terminated polydimethylsiloxane of example 2, 10 mg of the above described platinum (II) bipyridine complex and 2.5 g of the silicon hydride siloxane fluid of example 2. Approximately 15 mL of methylene chloride was added to help disperse the catalyst in the mixture. The mixture was mixed and then stripped in vacuo at ambient temperature to remove the methylene chloride. A homogeneous fluid was obtained. The gel time of the mixture at 137° C. was 828 seconds. In addition, the gelled material was quite soft, indicating an incomplete cure. The same procedure was repeated, except that there was utilized an equivalent wt % of the preformed catalyst of example 1. The gel time at 137° C. was found to be 290 seconds and the product was a hard gel indicating that the preformed zero valent platinum of example 1 was superior as a catalyst for effecting a cure of the heat curable organopolysiloxane mixture.

Additional platinum (II) complexes were prepared utilizing 2,2'-bipyridine and different platinum (II) complexes at 25 ppm platinum ($2.56 \times 10^{-5}$ mol platinum) such as, dichloro-bis-(diethylsulfide) platinum and bis-(benzonitrile) dichloro platinum. In addition, the platinum complex shown by Lamoreaux, U.S. Pat. No. 3,220,972, was evaluated. It was found that the catalyst prepared utilizing the platinum complex of Lamoreaux provided a gel time of more than 14 hours at 135° C. and a 50° C. stability of about 18 days. The platinum (II) complexes used in combination with 2,2'-bipyridine provided a gel time of 384 seconds at 135° C. for di- chloro-bis-(diethylsulfide) platinum and a gel time of 3000 seconds at 135° C. for the bis-(benzonitrile)dichloro platinum. The latter platinum (II) complexes provided 50° C. stability of about 7 days each. These results establish that the preformed latent platinum catalyst prepared from zero valent platinum catalyst and 2,2'-bipyridine is superior as a catalyst for heat curable organopolysiloxane compositions when compared to catalysts made from platinum (II) complexes or from Lamoreaux catalyst.

EXAMPLE 4

A further comparison was made with the preformed latent platinum catalyst of example 1, a preformed catalyst prepared from the zero valent platinum catalyst and an organic nitrogen compound free of polyvalent structural units of formula 1, such as tetramethylethylenediamine in place of 2,2'-bipyridine. The tetramethylethylenediamine was utilized as a preformed catalyst in combination with the Karstedt Pt catalyst shown in example 1 and tetraethylenediamine was utilized as an inhibitor added to a vinyl polymer containing the Karstedt Pt catalyst. The following procedure was used:

The heat curable composition was prepared by using 46 parts of a mixture made by blending 50 parts of the vinyl end-stopped polydimethylsiloxane of a vinyl silicone organopolysiloxane fluid having terminal dimethylvinylsiloxy units and an average of 140 dimethylsiloxy units and a viscosity of 350 centipoise at 25° C., 49 parts of α-quartz having a 10 micron size and 1 part of carbon black. To this silicone rubber formulation there was added 25 ppm of platinum in the form of the preformed latent platinum catalyst of example 1. The resulting mixture was then thoroughly mixed. There was then added 4 parts of the silicone hydride siloxane fluid of example 2. The resulting heat curable mixture is referred to hereinafter as preformed.

The above procedure was repeated except that in place of the preformed latent catalyst of example 1, there was added 25 ppm of platinum in the form of Karstedt catalyst, U.S. Pat. No. 3,775,452, 0.005 wt % of tetramethylenediamine and 4 parts of the silicon hydride siloxane fluid of example 2. The resulting heat curable organopolysiloxane formulation was hereinafter referred to as "TMEDA (inhibitor)". A further heat curable organopolysiloxane formulation is prepared following the above procedure except that a preformed latent catalyst was prepared in accordance with the procedure of example 1, except that in place of 2,2'-bipyridine, TMEDA was used which hereinafter is referred to as "TMEDA (preformed)". The following results were obtained

TABLE 4

| | Gel Time (Sec)<br>135° C. |
|---|---|
| Preformed (Example 1) | 256 |
| Inhibitor (TMEDA) | 847 |
| Preformed (TMEDA) | 2759 |

The above results show that the preformed latent platinum catalyst made by reacting an organic nitrogen compound having the structural unit of formula 1 provides heat curable organopolysiloxane compositions having superior cure speed at 135° C.

Accelerated aging test was also performed at 50° C. over a 5 day period with the above described heat curable organopolysiloxane compositions. The following results were obtained:

TABLE 5

| | Viscosity Change (50° C.) | |
|---|---|---|
| | Initial | 5 days |
| Preformed (Example 1) | 864 | 904 |
| Inhibitor (TMEDA) | 872 | 1030 |
| Preformed (TMEDA) | 992 | 1680 |

The above results show that the heat curable compositions of the present invention exhibit superior shelf stability over 5 day accelerated aging at 50° C.

EXAMPLE 5

A preformed latent platinum catalyst was prepared using the zero valent platinum complex of Example 1, and 1,10-phenanthroline. There was used (0.0302 g $1.68 \times 10^{-4}$ tool) of 1,10-phenanthroline (1,10-phen) to 0.132 g ($1.40 \times 10^{-4}$ mol Pt) of the zero valent platinum complex. The 1,10-phenanthroline was added as a solution in 1 mL of $CDCl_3$. The initial mixture having 1.2 equivalents of 1,10-phenanthroline per mol of Pt was a water white color which turned to golden yellow in color almost instantaneously upon mixing the two ingredients. Based on method of preparation the resulting mixture was a solution of a preformed latent platinum catalyst resulting from a zero valent platinum complex and 1,10-phenanthroline. Identity of the product was further confirmed by $^1H$ and $^{13}C$ NMR analysis which confirmed the presence of new aromatic peaks at δ: 8.91 (dd, 2H, J=2,5 Hz), 7.60 (dd, 2H, J=2,8 Hz), 7.21 (s, 2H), 7.04 (dd, 2H, J=5,8 Hz)ppm; cf 1,10-phen $^1H$ NMR δ: 8.98 (dd, 2H, J-2,8 Hz), 7.23 (s, 2H), 7.03 (dd, 2H J=4,8 Hz)ppm; IR (KBr) showed new peaks at 1583 (w), 1560 (w), 1456 (w), 1417 (m), 1410 (m)cm$^{-1}$; cf. 1,10-phen IR (KBr), 1645 (w), 1616 (w), 1587 (m), 1561 (m), 1422 (s) 852 (s), 737 (m) cm$^{-1}$. $^1H$ and $^{13}C$ NMR show that only free $M^{vi}M^{vi}$ was present; no Pt coordinated to $M^{vi}M^{vi}$ was present after the addition of 1,10-phen. Thus, presumably the $M^{vi}M^{vi}$ ligand was replaced by 1,10-phen to form a new $Pt°(1, 10\text{-phen})_x$ complex.

A heat curable organopolysiloxane mixture was prepared in accordance with the procedure of example 2 using an equivalent number of moles of the above 1,10-phenanthroline preformed latent catalyst in place of the 2,2'-bipyridine catalyst. Substantially equivalent cure results were obtained.

EXAMPLE 6

The procedure of Example 5 was repeated except that 1.2 equivalents (0.030 g, $1.71 \times 10^{-4}$ mol) of 4-phenyl-1,2,4-triazoline-3,5-dione (PTD) and 1 mL of $CDCl_3$ was added to 0.133 g ($1.42 \times 10^{-4}$ mols Pt) of the platinum complex of Example 1. The initial mixture which was red converted almost instantaneously to a dark maroon-brown. After 2.5 hours, the mixture turned green-brown in color. Based on method of preparation there was obtained a preformed latent platinum catalyst of zero valent platinum complex of Example 1 and 4-phenyl-1,2,4-triazoline-3,5-dione. The identity of the preformed latent platinum catalyst was further confirmed by $^1H$ and $^{13}C$ NMR analysis which confirmed the presence of new aromatic peaks at δ: 7.45 (m, broad), ppm; cf. PTD $^1H$ NMR δ: 7.44 (m, 5H, sharp signals)ppm; $^{13}C$ NMR δ: 119.1 (Broad), 125.7 (Broad), 119.9 (Broad) ppm; cf. PTD $^{13}C$ NMR δ: 157.7, 129.9, 129.5, 129.3, 123.9 ppm; IR (KBr) showed new peaks at 1714 (m, broad), 1411 (w, broad) cm$^{-1}$; cf. PTD 1771 (s), 1749 (s), 1716 (m, broad), 1701 (m, broad), 1400 (m, sharp) cm$^{-1}$. $^1H$ and $^{13}C$ NMR show that only free $M^{vi}M^{vi}$ was present; no Pt coordinated to $M^{vi}M^{vi}$ was present after the addition of PTD. Thus, presumably the $M^{vi}M^{vi}$ ligand was replaced by PTD to form a new $Pt°(PTD)_x$ complex.

A heat curable organopolysiloxane mixture was prepared in accordance with example 2, employing an effective amount of the above preformed latent catalyst prepared from PTD and zero valent platinum complex. Substantially equivalent cure results were obtained.

EXAMPLE 7

In accordance with the procedure of Example 5, there was added 1.2 equivalents (0.067.g, $2.53 \times 10^{-4}$ mols) of azobistoluoyl (ABT) in 1 mL of $CDCl_3$ to 0.200 g ($2.11 \times 10^{-4}$ mol Pt) of the zero valent platinum complex of Example 1. The resulting mixture was initially an orange-yellow color which turned red upon mixing the ingredients. After 2 hours the mixture turned to an orange-red color. Based on method of preparation there was obtained a preformed latent platinum catalyst formed by reacting azobistoluoyl (ABT) and a zero valent platinum complex. Identity of the preformed latent platinum catalyst was further confirmed by $^1H$ and $^{13}C$ NMR analysis which confirmed the presence of new peaks at δ: 7.79 (m, 4H), 7.17 (m, 4H), 2.28 (m, 6H) ppm; cf. ABT $^1H$ NMR δ: 7.92 (d, 4H, J = 8 Hz), 7.35 (d, 4H, J=8 Hz), 2.46 (s, 6H) ppm; $^{13}C$ MNR δ: 146.5, 130.7, 129.9, 129.5, 128.9, 128.8, 128.0, 126.3, 22.0, 21.5, 21.4 ppm; cf. ABT $^{13}C$ NMR δ: 180.7, 146.6, 130.7, 129.8, 126.3, 22.0 ppm; IR (KBr), 1723 (w), 1628 (m), 1611 (m), 1574(m), 1259 (s), cm$^{-1}$; cf. ABT IR (KBr): 1718 (s), 1607 (m), 1244 (m), 1176 (m) cm$^{-1}$. $^1H$ and $^{13}C$ NMR show that only free $M^{vi}M^{vi}$ was present; no Pt coordinated to $M^{vi}M^{vi}$ was present after the addition of ABT. Thus, presumably the $M^{vi}M^{vi}$ ligand was replaced by ABT to form a new $Pt°(ABT)_x$ complex.

A heat curable organopolysiloxane mixture was prepared using an effective amount of the above latent platinum catalyst. Results substantially similar to example 2 were obtained.

EXAMPLE 8

In accordance with the procedure of Example 1, there was added 3.1 equivalents (0.113 g, $6.45 \times 10^{-4}$ mol) of azobis(N,N'-dimethylformamide) (ABDMF) in 1 mL of $CDCl_3$ to 0.200 g ($2.11 \times 10^{-4}$ mol of Pt) of the platinum complex of Example 1. Upon mixing of the ingredients, the initial color of the resulting mixture which was gold turned instantaneously to yellow-brown. Based on method of preparation there was obtained a preformed latent platinum catalyst formed by reacting zero valent platinum complex and ABDMF. The identify of the preformed latent platinum catalyst was further confirmed by $^1H$ and $^{13}C$ NMR analysis which confirmed the presence of new methyl peaks and new carbonyl peaks in the $^{13}C$ NMR. $^1H$ NMR δ: 2.96 (s, 6H), 2.87 (s, 6H) ppm; cf. ABDMF $^1H$ NMR δ: 3.05 (s, 6H), 2.96 (s, 6H) ppm; $^{13}C$ NMR δ: 161.4, 158.8, 36.2 ppm; cf. ABDMF $^{13}C$ NMR δ: 161.2, 35.9 ppm; IR (KBr) showed new peaks at 1705 (s, broad), 1597 (m), 1402 (s, broad) cm$^{-1}$; cf. ABDMF (KBr) 1682 (s), 1667 (s) , 1377 (m) , 1140 (m) cm$^{-1}$. $^1H$ and $^{13}C$ NMR showed that only free $M^{vi}M^{vi}$ was present; no Pt coordinated to $M^{vi}M^{vi}$ was present after the addition of ABDMF. Thus, presumably the $M^{vi}M^{vi}$ ligand was replaced by ABDMF to form a new Pt°(ABDMF)$_x$ complex.

A heat curable organopolysiloxane mixture was prepared in accordance with example 2 using the ABDMF preformed latent platinum catalyst in an effective amount. A satisfactory cure was obtained with the heat curable mixture following the procedure of example 2.

EXAMPLE 9

In accordance with the procedure of Example 5, 60 µL (3.8×10$^{-4}$ mol) of diethylazodicarboxylate (DEAD) and 0.5 mL of C$_6$D$_6$ was added to 0.205 g (3.8×10$^{-4}$ tools Pt) of the platinum complex of Example 1. The resulting mixture which was initially gold turned almost instantaneously to a red color and after 3 hours the solution turned to a yellow color. Based on method of preparation the product was a preformed latent platinum complex compound of a zero valent platinum complex and DEAD. The identity of the platinum complex compound was further confirmed by $^1$H and $^{13}$CNMR analysis which confirmed the presence of new ethyl peaks at δ: 0.82 (t, J=7 Hz), 0.83 (t, J=7 Hz), 3.87 (q, J=7 Hz), 3.88 (q, J=7 Hz) ppm; cf. DEAD δ: 0.86 (t, J=7 Hz), 3.93 (q, J=7 Hz) ppm; IR showed new peaks at 1732, 1531, 1234, 1085 and 810 cm$^{-1}$. $^1$H and $^{13}$C NMR showed that only free M$^{vi}$M$^{vi}$ was present; no Pt coordinated to M$^{vi}$M$^{vi}$ was present after addition of DEAD. Thus, presumably the M$^{vi}$M$^{vi}$ ligand was replaced by DEAD to form a new Pt°(DEAD)$_x$ complex.

A one part addition curable mixture was prepared utilizing 50 g of the vinyl end-stopped polydimethylsiloxane fluid of Example 2, and sufficient preformed latent platinum catalyst of DEAD to provide a homogeneous yellow green silicone mixture containing 25 ppm of platinum. To this mixture there was added 1.25 g of a siloxane hydride crosslinker (2.5 parts) of Example 2 and the formulation was mixed for approximately 2 minutes. The mixture was then checked for gel time at 150° C. and it was found to be 833 seconds. The curable silicone mixture also had accelerated stability of about 23 days at 50° C. and a room temperature stability of greater than 90 days.

EXAMPLE 10

In accordance with the procedure of Example 1, there was added 1.2 eq (0.051 g, 2.53×10$^{-4}$ mol) of diisopropylazodicarboxylate (DIAD) in 1 mL of CDCl$_3$ to 0.200 g (2.11×10$^{-4}$ mol of Pt) of the platinum siloxane complex of Example 1. Upon mixing of the ingredients the initial color of the mixture which was gold changed to a red color almost instantaneously and after 2 hours the solution turned to a yellow color. Based on method of preparation there was obtained a preformed latent platinum catalyst of zero valent platinum complex and DIAD. The identity of the preformed latent platinum catalyst was further confirmed by $^1$H and $^{13}$C NMR analysis which confirmed the presence of new isopropyl peaks and a new carbonyl peak in the $^{13}$C NMR. $^1$H NMR (CDCl$_3$) δ: 1.40 (d, 12H, J=6 Hz), 5.21 (sept., 2H, J=6 Hz) ppm; cf. DIAD δ: 1.39 (d, 12H, J=3 Hz), 5.20 (sept. 2H J=3 Hz) ppm; $^{13}$C NMR δ: 159.8, 74.0, 21.9, 21.5 ppm; cf. DIAD $^{13}$C NMR δ: 159.9, 74.3, 21.5 ppm; IR (KBr) showed new peaks at 1728 (m, broad), 1469 (w), 1259 (m), 1078 (s) cm$^{-1}$; cf. DIAD (KBr) 1777 (vs), 1470 (w), 1390 (w), 1246 (s), 1098 (s) cm$^{-1}$. $^1$H and $^{13}$C NMR showed that only free M$^{vi}$M$^{vi}$ was presnet; no Pt coordinated to M$^{vi}$M$^{vi}$ was present after the addition of DIAD. Thus, presumably the M$^{vi}$M$^{vi}$ ligand was replaced by DIAD to form a new Pt°(DIAD)$_x$ complex.

EXAMPLE 11

A base formulation was prepared by combining 92 parts of a vinyl stopped polydimethyl siloxane fluid having an average viscosity of 250-400 cps with 47.5 parts of minusil, (α quartz), and 0.5 part of hexamethyldisilazane-treated fumed silica. The mixture was blended in a Ross Double Planetary mixer to provide a homogeneous base fluid having a 800 cps viscosity.

Quinazoline (0.189 g) was combined with 0.2 g of the platinum catalyst of Example 1 and 1 g of tetrahydrofuran. The mixture was stirred and then 0.19 g of the platinum quinazoline mixture was added to 48 g of the base formulation followed by addition of 2 g of a silicon hydride siloxane fluid of Example 2. After 24 days at 50° C., the heat curable formulation had a viscosity of 1330 centapoise (cps). A portion of the formulation was heated at 150° C. for 20 minutes to provide a cured sample having a shore A durometer of 43.

EXAMPLE 12

The procedure of Example 11 was repeated except quinoxaline (0.566 g) was combined with 0.2 g of the platinum catalyst. After stirring, 0.31 g of the resulting platinum quinoxaline catalyst was added to 48 g of the base formulation described in Example 11 followed by addition of 2 g of the siloxane hydride crosslinker. After 4 days at 50° C., the resulting mixture had a viscosity of 1270 cps. Heating the mixture at 150° C. for 20 minutes provided a cured product with a shore A durometer at 49.

EXAMPLE 13

The procedure of Example 11 was repeated except 4,4'-trimethylene dipyridine (0.057 g) was combined with 0.2 g of the platinum catalyst. After stirring, 0.17 g of the platinum trimethylene dipyridine catalyst was added to 48 g of the base formulation described in Example 11 followed by addition of 2 g of the siloxane hydride crosslinker. After 16 days at 50° C. the resulting mixture had a viscosity of 1250 cps. Heating the mixture at 150° C for 30 minutes provided a cured product with a shore A durometer of 38.

EXAMPLE 14

The procedure of Example 11 was repeated except 2,2':6',2''-terpyridine (0.67 g) was combined with 0.2 g of the platinum catalyst. After stirring, 0.25 g of the platinum terpyridine catalyst was added to 48 g of the base formulation described in Example 11 followed by addition of 2 g of the siloxane hydride crosslinker. After 18 days at 50° C., the resulting mixture had a viscosity of 1500 cps. Heating the mixture at 150° C. for 30 minutes provided a cured product with a shore A durometer of 41.

EXAMPLE 15

The procedure of Example 11 was repeated except quinoline (0.34 g) was combined with 0.2 g of the platinum catalyst. After stirring, 0.21 g of the platinum-quinoline catalyst was added to 48 g of the base formulation followed by addition of 2 g of the siloxane hydride crosslinker. After 7 days at 50° C., the resulting mixture had a viscosity of 1140 cps. Heating the mixture at 150° C. for 30 minutes provided a cured product with a shore A durometer of 46.

EXAMPLE 16

The procedure of Example 11 was repeated except isoquinoline (0.34 g) was combined with 0.2 g of platinum catalyst. After stirring, 0.21 g of the platinum-isoquinoline catalyst was added to 48 g of the base formulation followed by addition of 2 g of the siloxane hydride crosslinker. After 7 days at 50° C., the resulting mixture had a viscosity of 848 cps. Heating the mixture at 150° C. for 30 minutes provided a cured product having a shore A durometer of 38.

Although the above examples are directed to only a few of the very many variables to which the present invention is directed, it should be understood that the present invention is directed to the preparation and to a much broader variety of preformed latent platinum catalysts by reacting a zero valent platinum complex in combination with an organic nitrogen compound having the structural unit of formula (1) in the substantial absence of a silicone fluid as set forth in the description preceding these examples. In addition a much broader variety of heat curable organopolysiloxane compositions are also provided.

What is claimed is:

1. A method for making a preformed latent platinum catalyst which comprises heating a mixture to a temperature of 0° C. to 100° C. consisting essentially of (a) complex of zero-valent platinum, (b) 1.0 to 60 moles, per mole of the complex of zero valent platinum of an organic nitrogen compound and (c) 0 to 99 parts by weight of an inert organic solvent based on 100 parts by weight of the sum of (a), (b) and (c), where the organic nitrogen compound is a member selected from the class consisting of aliphatic nitrogen compounds, heterocyclic aromatic nitrogen compounds and mixtures thereof having the characteristic polyvalent structural unit,

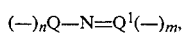

$(-)_n Q-N=Q^1(-)_m$, where Q is a carbon or nitrogen radical, $Q^1$ is a carbon or nitrogen radical, n is an integer equal to 2 or 3, and m is an integer equal to 1 or 2.

2. A preformed latent platinum catalyst made in accordance with the method of claim 1, where the organic nitrogen compound is diisopropyl azodicarboxylate.

3. A preformed latent platinum catalyst made in accordance with the method of claim 1, where the organic nitrogen compound is azobiabenzoyl.

4. A preformed latent platinum catalyst made in accordance with the method of claim 1, where the organic nitrogen compound is azobis (N,N'-dimethylformamide).

5. A preformed latent platinum catalyst made in accordance with the method of claim 1, where the organic nitrogen compound is 4-methyl-1,2,4-triazoline-3,5-dione.

6. A preformed latent platinum catalyst made in accordance with the method of claim 1, where the organic nitrogen compound is 1,10-phenanthroline.

7. A preformed latent platinum catalyst made in accordance with the method of claim 1, where the organic nitrogen compound is di-t-butyl azodicarboxylate.

8. A preformed latent platinum catalyst made in accordance with the method of claim 1, where the organic nitrogen compound is neocuproine.

9. A preformed latent platinum catalyst made in accordance with the method of claim 1, where the organic nitrogen compound is dibenzyl azodicarboxylate.

10. A preformed latent platinum catalyst made in accordance with the method of claim 1, where the organic nitrogen compound is 2,2'-bipyridine.

11. A preformed latent platinum catalyst made in accordance with the method of claim 1, where the organic nitrogen compound is diethyl azodicarboxylate.

12. A preformed latent platinum catalyst made in accordance with the method of claim 1, where the organic nitrogen compound is 4-phenyl-1,2,4-triazoline-3,5-dione.

13. A preformed latent platinum catalyst made in accordance with the method of claim 1, where the organic nitrogen compound is phthalazine.

14. A preformed latent platinum catalyst made in accordance with the method of claim 1, where the organic nitrogen compound is quinazoline.

15. A preformed latent platinum catalyst made in accordance with the method of claim 1, where the organic nitrogen compound is quinoxaline.

16. A preformed latent platinum catalyst made in accordance with the method of claim 1, where the organic nitrogen compound is quinoline.

17. A preformed latent platinum catalyst made in accordance with the method of claim 1, where the organic nitrogen compound is isoquinoline.

18. A preformed latent platinum catalyst made in accordance with the method of claim 1, where the organic nitrogen compound is 4,4'-dipyridyl.

19. A preformed latent platinum catalyst made in accordance with the method of claim 1, where the organic nitrogen compound is 3,3'-dipyridyl.

20. A preformed latent platinum catalyst made in accordance with the method of claim 1, where the organic nitrogen compound is 2,4'-dipyridyl.

21. A preformed latent platinum catalyst made in accordance with the method of claim 1, where the organic nitrogen compound is benzimidazole.

22. A preformed latent platinum catalyst made in accordance with the method of claim 1, where the organic nitrogen compound is indazole.

23. A preformed latent platinum catalyst made in accordance with the method of claim 1, where the organic nitrogen compound is dipyridyl ketone.

24. A preformed latent platinum catalyst made in accordance with the method of claim 1, where the organic nitrogen compound is pyridine.

25. A preformed latent platinum catalyst made in accordance with the method of claim 1, where the organic nitrogen compound is 2,2':6',2''-terpyridine.

26. A preformed latent platinum catalyst made in accordance with the method of claim 1, where the organic nitrogen compound is 4,4'-trimethylene dipyridine.

* * * * *